United States Patent Office 3,538,073
Patented Nov. 3, 1970

3,538,073
COBALT CONTAINING AZO DYESTUFFS
Peter Albert Mack and Raymond Price, Manchester, England, assignors to Imperial Chemical Industries Limited, London, England, a corporation of Great Britain
No Drawing. Filed Jan. 27, 1966, Ser. No. 523,290
Claims priority, application Great Britain, Feb. 2, 1965, 4,530/65
Int. Cl. C09b 45/00; D06p 1/02
U.S. Cl. 260—146          5 Claims

ABSTRACT OF THE DISCLOSURE

Metal-containing azo dyestuffs of the formula:

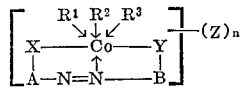

wherein A represents a substituted or unsubstituted phenylene or naphthylene radical carrying the —O— or —COO— group represented by X in ortho position to the azo group, or A represents the residue of a nitrogen-containing heterocyclic compound in which X represents a nitrogen atom which forms part of the heterocyclic ring and which is either directly attached or which is attached to a carbon atom adjacent to the carbon atom carrying the azo group. B—Y— represents the residue of a coupling component which couples in ortho or vicinal position to a metallizable group. Y represents —O— or

wherein R is hydrogen, lower alkyl or phenyl. Z is an acyl radical containing a reactive group which is capable of forming a covalent chemical bond with hydroxy or amino groups present in textile materials and which is attached to an —NH— or

lower alkyl group which is itself attached to a carbon atom of an aryl ring present in A or B or which forms part of $R^1$, $R^2$ or $R^3$. $n$ represents 1, 2 or 3 and $R^1$, $R^2$ and $R^3$ together form at least one molecule of a polydentate nitrogen-donor ligand, the coordinate bonds which link the said ligand to the cobalt atom being bonded to nitrogen atoms present in the said ligand, or when the said ligand is a bidentate nitrogen-donor ligand which only contains two nitrogen atoms capable of bonding with the cobalt atom then the third of $R^1$, $R^2$ and $R^3$ represents a monodentate ligand.

---

This invention relates to azo dyestuffs and more particularly it relates to metal-containing azo dyestuffs which are valuable for colouring textile materials, in particular cellulose and woollen textile materials.

According to the invention there are provided the metal-containing azo dyestuffs of the formula:

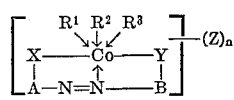

wherein:
A represents a substituted or unsubstituted phenylene or naphthylene radical carrying the —O— or —COO— group represented by X in ortho position to the azo group, or A represents the residue of a nitrogen-containing heterocyclic compound in which X represents a nitrogen atom which forms part of the heterocyclic ring and which is either directly attached or which is attached to a carbon atom adjacent to the carbon atom carrying the azo group;
B—Y— represents the residue of a coupling component which couples in ortho or vicinal position to a metallisable group;
Y represents —O— or

wherein R is hydrogen, lower alkyl or phenyl;
Z is an acyl radical containing a reactive group which is capable of forming a covalent chemical bond with hydroxy or amino groups present in textile materials and which is attached to an —NH— or

lower alkyl group which is itself attached to a carbon atom of an aryl ring present in A or B or which forms part of $R^1$, $R^2$ or $R^3$.
$n$ represents 1, 2 or 3; and
$R^1$, $R^2$ and $R^3$ together form at least one molecule of a polydentate nitrogen-donor ligand, the coordinate bonds which link the said ligand to the cobalt atom being bonded to nitrogen atoms present in the said ligand, or when the said ligand is a bidentate nitrogen-donor ligand which only contains two nitrogen atoms capable of bonding with the cobalt atom then the third of $R^1$, $R^2$ and $R^3$ represents a monodentate ligand.

The residues of the coupling components represented by B—Y— may be the residues of any coupling components which couple in ortho or vicinal position to a hydroxy or an amino, lower alkylamino or phenylamino group, or to an enolised keto group or a keto group which enolises to a hydroxy group, but preferably B represents the residue of a coupling component of the phenol, naphthol, acylacetarylamide, 5-pyrazolone in particular 1-aryl-5-pyrazolone, 5-aminopyrazole or naphthylamine series.

As examples of substituents, in addition to the acyl radicals represented by Z, which may be attached to A or which may be attached to aryl radicals, preferably phenyl or naphthyl radicals, present in the residues of the coupling components represented by B there may be mentioned chlorine or bromine atoms, or nitro, cyano, lower alkyl in particular methyl, lower alkoxy in particular methoxy, lower alkyl sulphonyl such as methylsulphonyl and ethylsulphonyl, sulphonic acid, carboxylic acid, sulphonamide and substituted sulphonamide such as N-lower alkyl sulphonamide and N-(hydroxy lower alkyl) sulphonamide for example N-methylsulphonamide, N:N-diethylsulphonamide, N-(β-hydroxyethyl)sulphonamide and N:N-di(β-hydroxyethyl)-sulphonamide, substituted or unsubstituted phenylazo or naphthylazo, and non-reactive acylamino such as formylamino, acetylamino, benzoylamino, benzenesulphonamido, p-toluenesulphonylamino, carbomethoxyamino, carboethoxyamino and carboisopropoxyamino groups.

Throughout this specification the terms "lower alkyl" and "lower alkoxy" groups are used to denote alkyl and alkoxy radicals containing from 1 to 4 carbon atoms.

As examples of acyl radicals which are represented by Z there may be mentioned, for example, the radicals of α:β-unsaturated aliphatic carboxylic acids such as acrylic, α-chloroacrylic acid, propiolic acid, maleic acid and mono- and di-chloromaleic acid; more particularly, Z may represent the radical of an acid which contains a labile halogen atom or a group which readily splits off to form an anion, for example the radical of a halogenated aliphatic acid such as chloroacetic acid, β-chloro and β-bromopropionic acids and α:β-dichloropropionic acid, or more especially, a heterocyclic radical which contains from 2 to 3 nitrogen atoms in the heterocyclic ring and at least one labile substituent on a carbon atom of the ring. By a labile substituent there is meant an atom or group which is bound to a carbon atom in ortho position to a nitrogen atom of the heterocyclic ring which atom or group is readily replaced by a hydroxyl group under aqueous alkaline conditions.

As examples of such heterocyclic radicals, there may be mentioned, for example 2:3-dichloro-quinoxaline-5- or -6-sulphonyl, 2:3-dichloroquinoxaline-5- or -6-carbonyl, 2:4-dichloro-quinazoline-6- or -7-sulphonyl, 2:4:6-trichloro-quinazoline-7- or -8-sulphonyl, 2:4:7- or 2:4:8-trichloroquinazoline-6-sulphonyl, 2:4-dichloroquinazoline-6-carbonyl, 1:4-dichlorophthalazine-6-carbonyl, and more particularly 1:3:5-triazin-2-yl and pyrimid-2- or -4-yl which contain on at least one of the remaining 2, 4 or 6 positions, a bromine or, preferably, a chlorine atom, a sulphonic acid group, a thiocyano group, an aryloxy or arylthio group containing an electro-negative substituent such as sulphophenoxy, sulphophenylthio, nitrosulphophenoxy, disulphophenoxy and sulphonaphthoxy, or a group of the formula:

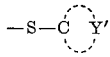

wherein Y' represents the group of atoms necessary to form a 5- or 6-membered heterocyclic ring which may carry substituents or form part of a fused ring system; or a quaternary ammonium, pyridinium or hydrazinium group; or a group of the formula:

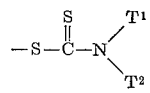

wherein $T^1$ and $T^2$ each represent the same or different alkyl, cycloalkyl, aryl or aralkyl groups, or $T^1$ and $T^2$ together form, together with the nitrogen atom, a 5- or 6-membered heterocyclic ring, or a group of the formula:

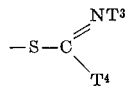

wherein $T^3$ and $T^4$ may be the same or different and each represents a hydrogen atom or an alkyl, aryl or aralkyl group.

In the cases where the pyrimidine ring or triazine ring carries only one such labile substituent, the said ring may have a non-labile substituent on the remaining carbon atoms. By a non-labile substituent there is meant a group which is bound by a covalent bond to a carbon atom of the triazine or pyrimidine nucleus, which covalent bond is not ruptured under the conditions used for application of the reactive dyestuffs to textile materials. As examples of such substituents, there may be mentioned, for example, primary amino and hydroxyl groups, also mono- or di-substituted amino groups, etherified hydroxyl and etherified mercapto groups; in the case of substituted amino groups, this class includes, for example, mono- and di-alkylamino groups in which the alkyl groups preferably contain at most 4 carbon atoms, and which may also contain such substituents as chlorine atoms or hydroxyl, alkoxy or sulphate groups; and phenylamino and napthylamino groups preferably containing sulphonic acid or carboxylic acid substituents; in the case of etherified hydroxyl and mercapto groups, this class includes, for example, alkoxy and alkylthio groups preferably those of low molecular weight, i.e. having up to about 4 carbon atoms and phenoxy, phenylthio, naphthoxy or napthylthio groups; as particular examples of all these substituents there may be mentioned, for example, methylamino, ethylamino, dimethylamino, β-hydroxyethylamino, di-(β-hydroxyethyl)amino, β-chloroethylamino, cyclohexylamino, anilino, sulphophenylamino, disulphophenylamino, N-methylsulphophenylamino, N-β-hydroxyethylsulphophenylamino, carboxyphenylamino and sulphocarboxyphenylamino, methoxy, ethoxy and butoxy, methylphenoxy, chlorophenoxy and phenylthio groups. Chlorine atoms or cyano, nitro, carboxy or carbalkoxy groups in the 5-position of a pyrimidyl radical also come into the category of non-labile substituents.

The term "polydentate nitrogen-donor ligand" denotes organic compounds which contain at least two primary, secondary or tertiary amino groups through which the compounds are capable of forming chelate complexes containing 5- or 6-membered heterocyclic rings. As examples of classes of polydentate nitrogen-donor ligands which can be present in the dyestuffs of the invention there may be mentioned organic compounds which contain at least two primary, secondary or tertiary amino groups, or organic compounds which contain the biguanide structure

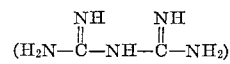

The said primary, secondary or tertiary amino groups can either be attached to aliphatic chains or to aromatic rings, in particular benzene rings, or in the case of secondary and tertiary amino groups they can in addition form part of a heterocyclic ring system.

As specific examples of such organic compounds which contain at least two primary, secondary or tertiary amino groups and which may be used as polydentate nitrogen-donor ligands there may be mentioned diaminoalkylenes and N-alkyl, N-(aminoalkyl) and C-(aminoalkyl) derivatives thereof, in particular diaminoalkylenes wherein the alkylene radical contains 2 or 3 carbon atoms and N-lower alkyl, N-(amino lower alkyl) and C-(aminoalkyl) derivatives thereof (wherein lower alkyl represents an alkyl radical containing from 1 to 4 carbon atoms) such as ethylenediamine, 1:2- or 1:3-diaminopropane, 1:2- or 1:3-diamino-n-butane, β-(N-methylamino)ethylamine, β-(N-ethylamino)ethylamine, β-(N:N-dimethylamino)ethylamine, N:N'-dimethylethylenediamine, N:N:N'-trimethylethylenediamine, N:N:N':N'-tetramethylethylenediamine, 1:2:3-triaminopropane, diethylenetriamine (i.e. N-[β-aminoethyl]ethylenediamine), N-(γ-aminopropyl)-1:3-diaminopropane, N-(β-aminoethyl)-1:3-diaminopropane, N-(β-methylaminoethyl)ethylenediamine, β:β'-di(dimethylamino)diethylamine, N-[β-{N-β'-aminoethylamino}ethyl]ethylenediamine and N-[β-(4'-aminophenylamino)ethyl]ethylenediamine; diamines of the benzene series such as o-diaminobenzene; and heterocyclic compounds such as 2:2'-dipyridyl, terpyridyl, o-phenanthroline and 8-aminoquinoline.

As examples of organic compounds which contain the biguanide structure and which may be used as polydentate nitrogen-donor ligands there may be mentioned biguanide, 1-N-(lower alkyl)biguanides such as 1-N-methylbiguanide, and 1-N-(monocyclic aryl)biguanides such as 1-N-phenylbiguanide, 1-N(3'- or 4'-sulphophenyl)biguanide, 1-N-(3'-amino-4'-sulphophenyl)biguanide and 1-N-(4'-amino-3'-sulphophenyl-biguanide.

The preferred polydentate nitrogen-donor ligands are diethylenetriamine, and triethylenetetramine.

The monodentate ligand represented by one of $R^1$, $R^2$ and $R^3$ may be a further molecule of the bidentate ligand functioning as a monodentate ligand, or is a compound having one centre through which the compound is capable of forming complexes with metals, and as examples of such compounds there may be mentioned water, ammonia, or a primary or secondary mono-amine, such as methylamine, diethylamine, dimethylamine, benzylamine and aniline.

According to a further feature of the invention there is provided a process for the manufacture of the metal-containing azo dyestuffs of the invention which comprises treating with an acylating reagent containing a reactive group which is capable of forming a covalent chemical bond with hydroxy or amino groups present in textile materials, a metal-containing azo compound of the formula:

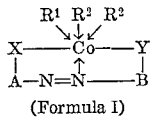

(Formula I)

wherein A, B, X, Y, $R^1$, $R^2$ and $R^3$ have the meanings stated, the said azo compound containing at least one acylatable $NH_2$ or —NH lower alkyl group which is either attached to A or B or forms part of $R^1$, $R^2$ and $R^3$.

The process of the invention may be conveniently brought about by stirring the metal-containing azo compound and the acylating agent together in water or in a mixture of water and a water-miscible organic liquid such as acetone, preferably at a temperature between 0° and 50° C., whilst maintaining the pH of the mixture between 6 and 8 by the addition of an acid-binding agent such as sodium carbonate. The resulting dyestuff can then be isolated by conventional means.

In carrying out the process of the invention it is necessary to use at least one molecular proportion of the acylating agent for each acylatable —$NH_2$ or —NH lower alkyl group present in the metal-containing azo compound.

As examples of acylating agents which can be used in the process of the invention there may be mentioned acid anhydrides or acid halides of $\alpha:\beta$-unsaturated aliphatic acids such as chloromaleic anhydride, propiolyl chloride and acrylyl chloride, acid chlorides of halogenated aliphatic acids such as chloroacetyl chloride, sulphochloroacetyl chloride, $\beta$-bromo and $\beta$-chloro-propionyl chloride and $\alpha:\beta$-dichloropropionyl chloride, and preferably, heterocyclic acompounds which contain at least 2 nitrogen atoms in the heterocyclic rings and which contain 2 or more halogen, especially chlorine, atoms in the ortho positions to the nitrogen atoms, such as 2,3-dichloro-quinoxaline-5- and 6-carboxylic acid chlorides, 2,3-dichloro-quinoxaline-5- and 6-sulphonyl chlorides, 2,4 - dichloro-quinazoline-6- and 7-sulphonyl chlorides, 2,4,6-trichloro-quinazoline-7- and 8-sulphonyl chlorides, 2,4,7- and 2,4,8-trichloro-quinazoline-6-sulphonyl chlorides, 2,4-dichloro-quinazoline-6-carboxylic acid chloride, 1,4-dichlorophthalazine-6-carboxylic acid chloride, 2,4,6-tri-bromo- and trichloro - pyrimidines, 2,4,5,6 - tetrachloropyrimidine, 5-methyl - 2,4,6-trichloropyrimidine, 5-nitro-2,4,6-trichloropyrimidine, 2,4 - dichloro - 5 - nitro-6-methylpyrimidine, 2,4-dichloro-5-nitropyrimidine, 2,4,6 - trichloro - 5 - cyanopyrimidine, 5 - carboethoxy - 2,4-dichloropyrimidine, 5-carboxy-2,4-dichloropyrimidine, cyanuric bromide and, preferably cyanuric chloride and the primary condensation products of cyanuric bromide or cyanuric chloride with ammonia, an alkali metal sulphite or thiocyanate or an organic mercaptan, hydroxy compound or an organic primary or secondary amine, for example methanol, ethanol, isopropanol, phenol, o-, m- and p-chlorophenols, o-, m- and p-cresols, o-, m- and p-sulphophenols, thiophenol, thioglycollic acid, dimethyldithio carbamic acid, mercaptobenzthiazole, thioacetamide, methyl-, dimethyl-, ethyl-, diethyl-, n-propyl, iso-propyl, butyl-, hexyl- or cyclohexyl-amine, toluidine, piperidine, morpholine, methoxyethylamine, ethanolamine, aminoacetic acid, aniline-2:5-, 2:4- and 3:5-disulphonic acids, orthanilic acid, metanilic acid and sulphanilic acids, 2-, 3- and 4-aminobenzoic acids, 4- and 5-sulpho-2-aminobenzoic acids, 5-amino - 2-hydroxybenzoic acid, 2-aminoethanesulphonic acid, aminonaphthalene mono- and di-sulphonic acids and N-methylaminoethanesulphonic acid; also,the secondary condensation products of cyanuric chloride with tertiary amines, alkali metal sulphites, alkali metal thiocyanates, phenols and thiophenols containing an electronegative substituent, and compounds of the formulae

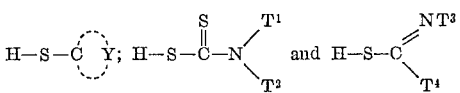

wherein Y', $T^1$, $T^2$, $T^3$ and $T^4$ have the meanings stated above.

The metal-containing azo compounds of Formula I used in the process of the invention can themselves be obtained by reacting a metallisable azo compound of the formulae:

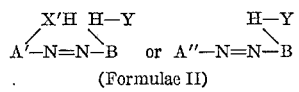

(Formulae II)

wherein B and Y have the meanings stated, A' represents a substituted or unsubstituted phenylene or naphthylene radical carrying the —OH or —COOH group represented by —X'H in ortho position to the azo group, —X'H can also represent an alkoxy group which is converted to a hydroxy group during formation of the cobalt complex, and A" represents the residue of a nitrogen-containing heterocyclic compound having a nitrogen atom, which forms part of the heterocyclic ring, situated in $\alpha$- or $\beta$-position to the carbon atom to which the azo group is attached, with a cobaltous or cobaltic complex of a polydentate nitrogen-donor ligand, provided that the said azo compound contains at least one —$NH_2$ or —NH lower alkyl group other than the group represented by YH, or the azo compound contains at least one nitro or acylamino group which can subsequently be converted to an amino group by reduction or hydrolysis respectively, and/or the polydentate nitrogen-donor ligand contains at least one —$NH_2$ or —NH lower alkyl group which after formation of the metal-containing azo compound is capable of acylation by the said acylating agent.

The said cobaltous or cobaltic complex of polydentate nitrogen-donor ligand and may itself be obtained by reacting a cobaltous salt, such as cobaltous chloride, sulphate or acetate, with a polydentate nitrogen-donor ligand.

The metallisable azo compounds of Formulae II may themselves be obtained by coupling a diazotised primary amine of the benzene or naphthalene series which contains a hydroxy, alkoxy or carboxylic acid group in ortho position to the amino group, or a diazotised primary amine of the nitrogen containing heterocyclic series which contains the primary amino group on a carbon atom which is situated in $\alpha$- or $\beta$-position to the heterocyclic nitrogen atom, with a coupling component which couples in ortho or vicinal position to a metallisable hydroxy, amino, lower alkylamino or phenylamino group or a keto group which enolises to a hydroxy group. There may also be used as the primary amines those amines of the benzene or naphthalene series which contain two diazotisable amino groups each of which is in ortho position to a metallisable group. The said primary diamines may be tetrazotisable diamines of the benzene or naphthalene series which contain a hydroxy, alkoxy or carboxylic acid group in ortho position to each of the amino groups, but preferably they are diamines of the diphenyl series which contain a hydroxy, alkoxy or carboxylic acid group in ortho position to each of the amino groups.

As specific examples of the said primary amines or diamines there may be mentioned 2-aminophenol,
4- or 5-nitro-2-aminophenol,
4- or 5-chloro-2-aminophenol,
4-chloro-5-nitro-2-aminophenol,
4-chloro-2-aminophenol-6-sulfonic acid,
6-chloro-2-aminophenol-4-sulphonic acid,
4-nitro-2-aminophenol-6-sulphonic acid,
6-nitro-2-aminophenol-4-sulphonic acid,
2-aminophenol-4:6-disulphonic acid,
4:6-dinitro-2-aminophenol,
2-aminophenol-4-sulphon-N-$\beta$-hydroxyethylamide, 2-aminophenol-4-β-hydroxyethylsulphone,
6-acetylamino-2-aminophenol-4-sulphonic acid,
4-acetylamino-2-aminophenol-6-sulphonic acid,
4-methyl-2-aminophenol,
4-methoxy-2-aminophenol,
2-aminophenol-4-sulphonamide,
2-aminophenol-4-sulphon-N-methylamide,
2-aminophenol-5-sulphonamide,
4-chloro-2-aminophenol 5- or 6- sulphonamide,
2-aminophenol-4-sulphon-N:N-dimethylamide,
2-aminophenol-4-methylsulphone,
2-aminophenol-4-ethylsulphone,
anthranilic acid,
2-amino-3-naphthoic acid,
4- or 5-chloro-anthranilic acid,
4- or 5-nitroanththranilic acid,
4- or 5-acetylamino-anthranilic acid,
4- or 5-sulphoanthranilic acid,
anthranilic acid 4-sulphonamide,
anthranilic acid 4- or 5-β-hydroxyethylsulphone,
anthranilic acid 4- or 5-ethylsulphone,
4- or 5-benzoylaminoanthranilic acid,
2-anisidine,
4- or 5-chloro-2-anisidine,
4- or 5-nitro-2-anisidine,
2-anisidine 4- or 5-sulphonic acid,
2-methoxy-5-methylaniline,
2-anisidine-4- or 5-sulphonic acid,
2:5-dimethoxyaniline,
2-anisidine-4- or 5-β-hydroxy-ethylsulphone,
2-amino-1-naphthol-4:8-disulphonic acid,
1-amino-2-naphthol-4-sulphonic acid,
1-amino-2-naphthol-4-sulphonamide,
2-aminophenol-4- or 5-sulphonic acid,
6-nitro-1-amino-2-naphthol-4-sulphonic acid,
6-acetylamino-1-amino-2-naphthol-4-sulphonic acid,
4-(2'-5'-disulphophenylazo)-2-methoxy-5-methylaniline,
4-(2':5'-disulphophenylazo)-2:5-dimethoxyaniline,
4-(2':5'-disulphophenylazo)-2-methoxy-1-naphthylamino-6-sulphonic acid,
4-(1':5'-disulphonaphth-2-ylazo)2:5-dimethoxyaniline,
4-(2'-,3'- or 4'-sulphophenylazo)-2-methoxyaniline,
dianisidine,
bensidine-3:3'-dicarboxylic acid,
4-(2', 3'- or 4'-sulphophenylazo)-2-methoxy - 5 - methylaniline,
4-(2', 3'- or 4'-sulphophenylazo)-2:5-dimethoxyaniline,
4-(2':5'- or 3':5'-disulphophenylazo)-2-methoxyaniline,
4-(3':5'-disulphophenylazo)-2-methoxy-5-methylaniline,
4-(3':5'-disulphonphenylazo)-2:5-dimethoxyaniline,
4-(2' - carboxy - 4', or 5'-sulphophenylazo)-2-methoxyaniline,
4-(2'-carboxy-4'- or 5'-sulphophenylazo)-2:5-dimethoxyaniline,
4-(2' - carboxy-4'- or 5'-sulphophenylazo)-2-methoxy - 5- methylaniline,
4-(2', 3'- or 4'-sulphophenylazo)-2:5-dimethoxyaniline,
4-(6':8'-disulphonaphth-2'-ylazo)-2-methoxyaniline,
4 -(6':8'-disulphonaphth-2'-ylazo)-2-methoxy-5-methoxyaniline and
4-(6':8'-disulphonaphth-2'-ylazo)2:5-dimethoxyaniline.

As examples of primary amines of the nitrogen-containing heterocyclic series there may be mentioned
8-aminoquinoline,
8-aminoquinoline-5-sulphonic acid,
2-aminothiazole,
2-aminobenzthiazole,
5-nitro-2-aminothiazole and
2-aminobenzthiazole-5 or 6-sulphonic acid.

As specific examples of the said coupling components there may be mentioned phenols such as p-cresol,
3:4-dimethylphenol,
2:4-dimethylphenol,
2- or 3-acetylamino-4-methylphenol,
4-t-butylphenol,
2-hydroxy-5:6:7:8-tetrahydronaphthalene,
2-hydroxy-3 - sulphonic acid - 5:6:7:8 - tetrahydronaphthalene,
2-carboethoxyamino-4-methylphenol,
resorcinol,
m-aminophenol,
2:4-dihydroxyacetophenone,
2:4-dihydroxyazobenzene,
2:4-dihydroxyazobenzene-2'- or 4'-sulphonic acid,
2:4-dihydroxyazobenbene-2':5'-disulphonic acid,
2:4-dihydroxy-4'-nitroazobenzene,
2:2':4-trihydroxyazobenzene-3:5'-disulphonic acid,
2:4-dihydroxy-4'- or 5'-(acetylamino)azobenzene-2'-sulphonic acid and
4-(2":4"-dihydroxyphenylazo)-4'-nitrostilbene - 2:2' - disulphonic acid;
naphthols such as 2-naphthol,
1:3- or 1:5-dihydroxynaphthalene,
2-naphthol-6-sulphonic acid,
1:8-dihydroxynaphthalene-3:6-disulphonic acid,
1:3-dihydroxynaphthalene-5-, 6- or 7-sulphonic acid,
1:3-dihydroxynaphthalene-5:7-disulphonic acid,
2-naphthol-6-sulphonamide,
2-naphthol-6-β-hydroxyethylsulphone,
1-amino-7-naphthol,
1-acetyl-amino-7-naphthol,
1-propionylamino-7-naphthol,
1-carbomethoxyamino-7-naphthol,
1-carboethoxyamino-7-naphthol,
1-carbopropoxyamino-7-naphthol,
2-amino-5-naphthol-7-sulphonic acid,
2-amino-5-naphthol-1:7-disulphonic acid,
1-amino-4-naphthol,
2-amino-6-naphthol,
2-acetylamino-5-naphthol-7-sulphonic acid,
2-benzoylamino-5-naphthol-7-sulphonic acid,
2-phenylamino-5-naphthol-7-sulphonic acid,
2-(3'-sulphoanilino)5-naphthol-7-sulphonic acid,
2-amino-8-naphthol-6-sulphonic acid,
2-acetylamino-8-naphthol-6-sulphonic acid,
2-(3'- or 4'-aminobenzoylamino)-5-naphthol-7-sulphonic acid,
2-(3'- or 4'-aminobenzoylamino)-8-naphthol-6-sulphonic acid,
1 - (3' or 4' - amino-benzoylamino-8-naphthol-3:6-disulphonic acid,
2-(3'- or 4'-aminoanilino)-5-naphthol-7-sulphonic acid,
2-(3'- or 4'-aminoanilino)-8-naphthol-6-sulphonic acid,
1-(3'- or 4' - aminoanilino) - 8-naphthol-3:6-disulphonic acid,
2 - (3' - amino - 4'-sulphoanilino)-5-naphthol-7-sulphonic acid,
2-phenylamino-8-naphthol-3:6-disulphonic acid,
2 - (4' - amino - 3'-sulphoanilino)-5-naphthol-7-sulphonic acid,
2-(4'-amino-3'-sulphoanilino)-8 - naphthol - 6 - sulphonic acid,
1-amino-8-naphthol-3:6-, -2:4- or -4:6-disulphonic acid,
1-amino-8-naphthol-4-sulphonic acid,
1-amino-5-naphthol-7-sulphonic acid,
1-acetyl-amino-8-naphthol-3:6- or -4:6-disulphonic acid,
1-benzoylamino-8-naphthol-3:6- or -4:6-disulphonic acid,
1-phenylamino-8-naphthol-3:6- or -4:6-disulphonic acid,
1-naphthol-4-sulphonic acid,
1-naphthol-4:6-disulphonic acid,
2-naphthol-6:8-disulphonic acid,
1-naphthol-5-sulphonic acid,
2-naphthol-3:6-disulphonic acid,
2-naphthol-3:6:8-trisulphonic acid,
1-amino-8-naphthol-4-sulphonic acid,
2-amino-8-naphthol-3:6-disulphonic acid,
6-acetyl-2-naphthol,
4-acetyl-2-naphthol,
4-acetyl-1-naphthol,
1-naphthol-3-, -4- or 5-sulphonamide, 2-naphthol-3-, -4-, -5-, -6-, -7, or 8-sulphonamide,
5:8-dichlor-1-naphthol,
2-methylamino-5-naphthol-7-sulphonic acid,
2-methylamino-8-naphthol-6-sulphonic acid,
1-butylamino-8-naphthol-3:6-disulphonic acid,
1-naphthol-3:6:8-trisulphonic acid,
6-β-hydroxyethylsulphonyl-2-naphthol-3-sulphonic acid,
1-naphthol-3:6- or 3:8-disulphonic acid,
2-(4'-nitrophenylazo)-1-amino-8 - naphthol - 3:6 - disulphonic acid,
2-(2'- or 4'-sulphophenylazo) - 1 - amino - 8 - naphthol-3:6-disulphonic acid, and
2-(2':5'-disulphophenylazo)-1-amino - 8 - naphthol-3:6-disulphonic acid,
2-naphthol-7- or -8-sulphonic acid;
heterocyclic coupling components such as barbituric acid 2:4-dihydroxy-quinoline; 5-pyrazolones such as 1:3-dimethyl-5-pyrazolones, but more particularly 1-aryl-5-pyrazolones such as
1-phenyl-3-methyl-5-pyrazolone,
1-(2-', 3'-, or 4'-methylphenyl)-3-methyl-5-pyrazolone,
1-(2'-, 3'- or 4'-sulphophenyl)-3-methyl-5-pyrazolone,
1 - [3' - or 4' - (β - hydroxyethylsulphonyl)phenyl] - 3 - methyl-5-pyrazolone,
1-phenyl-3-methyl-5-pyrazolone,
1-3'- or 4'-aminophenyl)-3-methyl-5-pyrazolone,
1-(2'-methoxyphenyl)-3-methyl-5-pyrazolone,
1-(2'-, 3'- or 4'-chlorophenyl)-3-methyl-5-pyrazolone,
1-(3'- or 4'-aminophenyl)-3-carboxy-5-pyrazolone,
1-(3'-amino-4'-sulphophenyl) - 3 - (carboxy or methyl-5-pyrazolone,
1-(4'-amino-3'-sulphophenyl)-3-(carboxy or methyl) - 5 - pyrazolone,
1-(2'-, 3'- or 4'-nitrophenyl)-3-methyl-5-pyrazolone,
1-(2':5'- or 3':4'-dichlorophenyl)-3-methyl-5-pyrazolone,
1-(2'-, 3'- or 4'-sulphamylphenyl)-3-methyl-5-pyrazolone,
1-(2'-, 3'- or 4'-methylsulphonylphenyl)-3-methyl-5-pyrazolone,
1-phenyl-5-pyrazolone-3-carboxycresidide,
1-phenyl-5-pyrazolone-3-carboxy-2'-toluidide,
1-phenyl-5-pyrazolone-3-carboxyanilide,
1:3-diphenyl-5-pyrazolone,
1-(2'-, 3'- or 4'-N-methylsulphamylphenyl)-3 - methyl-5-pyrazolone,
1-(6'-chloro-3'-methyl-4'-sulphophenyl)-3-methyl-5-pyrazolone,
1-(2':5'-dichloro-4'-sulphophenyl) - 3 - methyl - 5 - pyrazolone,
1-(2'-methyl-5'-sulphophenyl) - 3 - methyl-5-pyrazolone,
1-(4'-chloro-2'-sulphophenyl)-3-methyl-5-pyrazolone,
1-(6'-chloro-4'-sulpho-2'-methylphenyl)-3-carboethoxy-5-pyrazolone,
1-(2':5'-disulphophenyl)-3-methyl-5-pyrazolone,
1-(4'-sulphophenyl)-3-carboxy-5-pyrazolone,
1-(2'-, 3'- or 4'-carboxyphenyl)-3-methyl-5-pyrazolone,
1-(6'-chloro-4'-sulpho-2'-methylphenyl)-3-methyl-5-pyrazolone and
3-carboxy-5-pyrazolone;
acylacetarylamides in particular acetoacetanilides and benzoylacetanilides such as
acetoacetanilide,
acetoacet-4-(β-hydroxyethylsulphonyl)anilide,
acetoacet-o-anisidide,
acetoacet-o-toluidide,
acetoacet-o-chloranilide,
acetoacetanilide-3- or -4-sulphonic acid,
acetoacet-3- or 4-aminoanilide,
acetoacet-m-xylidide,
acetoacetanilide-2, -3- or -4-carboxylic acid,
benzoylacetanilide,
benzoylacetanilide-3- or -4-sulphonic acid,
benzoylacet-3- or -4-aminoanilide, and
acetoacetanilide-4-sulphonamide; and
naphthylamines such as
2-naphthylamine,
2-methylaminonaphthalene,
2-aminonaphthalene-6-sulphoamide,
2-amino-8-naphthol-6-sulphonic acid,
2-methylamino-8-naphthol-6-sulphonic acid and
2-phenylamino-8-naphthol-6-sulphonic acid.

In the case of the metal-containing azo dyestuffs of the invention which contain, as the reactive acyl group, a dihalogeno-1:3:5-triazin-2-yl group it is preferred that the dyestuffs be isolated and subsequently dried in the presence of a buffering agent which gives a pH of between 6.0 and 7.0. As examples of such buffering agents there may be mentioned mixtures of disodium hydrogen phosphate and sodium dihydrogen phosphate, and mixtures of sodium diethyl metanilate and sodium hydrogen sulphate.

The metal-containing azo dyestuffs of the invention which contain, as the reactive acyl group, a heterocyclic ring (in particular a 1:3:5-triazine ring) carrying a single labile chlorine or bromine atom or one or two labile groups, can also be obtained by reacting the corresponding metal-containing azo dyestuff containing two chlorine or bromine atoms attached to the heterocyclic ring (in particular a 1:3:5-triazine ring) with the appropriate compound so as to replace one or both of the labile chlorine or bromine atoms by the required group or groups. Thus one of the said chlorine or bromine atoms can be replaced by an amino or substituted amino group by reaction with ammonia or a primary or secondary amine; an alkoxy or aryloxy group (including substituted aryloxy groups) can be introduced by reaction with an alcohol or the appropriate phenol; a sulphonic acid group or groups can be introduced by recation with an alkali metal sulphite; a thiocyano group or groups can be introduced by reaction with potassium thiocyanate; a group or groups of the above formula:

$$-S-C\overset{\cdots}{\underset{\cdots}{Y'}}$$

can be introduced by reaction with the sodium salt of the appropriate mercapto-heterocyclic compound, such as 2-mercaptobenzthiazole, 2-mercaptobenzselenazole, 2-mercaptobenzoxazole, 2-mercaptopyridine and 2-mercapto-6-(methoxy-, acetylamino-, nitro- or sulpho)-benzthiazole; a group or groups of the above formula:

$$-S-\overset{S}{\underset{\|}{C}}-N\overset{T^1}{\underset{T^2}{\diagdown}}$$

can be introduced by reaction with the sodium salt of the appropriate dithiocarbamate such as sodium di(methyl, ethyl or phenyl)dithiocarbamate; and a group of the above formula:

$$-S-C\overset{NT^3}{\underset{T^4}{\diagdown}}$$

can be introduced by reaction with a thioamide such as thioacetamide and thioacetanilide.

The metal-containing azo dyestuffs of the invention which contain, as the reactive acyl group, a 1:3:5-triazine ring carrying a single quaternary ammonium group can be obtained by reacting the corresponding dyestuff which contains a monohalogeno-1:3:5-triazine ring with a tertiary amine such as pyridine, trimethylamine, 1:4-diazobicyclo-(2:2:2)-octane or N:N-dimethylhydrazine.

The metal-containing azo dyestuffs of the invention are valuable for colouring textile materials such as natural and synthetic polyamide textile materials (for example wool, silk and polyhexamethyleneadipamide textile materials) and also leather, but more especially for colouring cellulose textile materials, for example cotton, linen and viscose rayon textile materials. The said dyestuffs can be applied to textile materials by the processes which are conveniently employed for applying reactive dyestuffs to textile materials, whereby the textile materials are coloured in a wide range of shades which possess excellent fastness to wet treatments and to light. It has also been found that the light fastness is not noticeably affected by crease resist treatments, and this is of particular importance since it is well known that the light fastness of dyeings is adversely affected by crease-resist treatments.

EXAMPLE 1

A solution of 89.1 parts of the 1:1-cobalt complex of the formula:

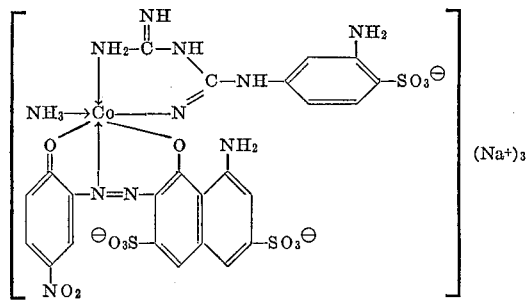

(which is obtained as described below) in 1200 parts of water is added, during 30 minutes, to a stirred suspension of 40.6 parts of cyanuric chloride in a mixture of 400 parts of water and 200 parts of acetone, the mixture being maintained between 0° and 5° C. by external cooling, and the pH of the mixture being maintained between 6.5 and 7.0 by the gradual addition of sodium carbonate. The mixture is then stirred for a further 30 minutes at the same temperature and pH. A solution of 57.5 parts of sodium metanilate in 300 parts of water is then added, and the resulting mixture is stirred for 30 minutes at 40° C., while the pH is maintained at 7.0 by the addition of sodium carbonate. The mixture is then cooled to 20° C., 475 parts of potassium chloride are added, and the precipitated dyestuff is filtered off, washed with a 25% aqueous solution of potassium chloride and dried.

The dyestuff so obtained consists essentially of the compound of the formula

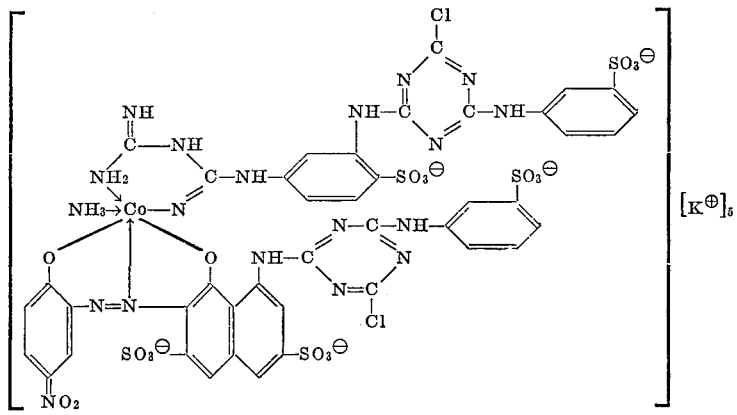

When applied to cellulose textile materials in conjunction with a treatment with an acid-binding agent the dyestuff yields reddish-grey shades possessing excellent fastness to light and to wet treatments.

The 1:1-cobalt complex used in the above example was obtained as follows:

A stream of air is bubbled through a mixture of 62.9 parts of the potassium salt of the 1:1-cobalt complex of 1-amino-7-(2'-hydroxy-5'-nitrophenylazo)-8-naphthol-3:6-disulphonic acid containing coordinated ammonia (obtained by reacting 1-amino-7-(2'-hydroxy-5'-nitrophenylazo)-8-naphthol-3:6-disulphonic acid with an ammoniacal solution of one molecular proportion of cobaltous sulphate), 136 parts of 1-(3'-amino-4'-sulphonphenyl)

biguanide, 20 parts of sodium hydroxide, 5 parts of active carbon and 2000 parts of water which is stirred for 15 minutes at 70° C. The mixture is then filtered, the pH of the filtrate adjusted to 7.0 and again filtered. 400 parts of potassium chloride are added to the resulting filtrate and the precipitated 1:1-cobalt complex is filtered off, washed with a 25% aqueous solution of potassium chloride and dried.

EXAMPLE 2

A solution of 74.1 parts of the 1:1-cobalt complex of the formula

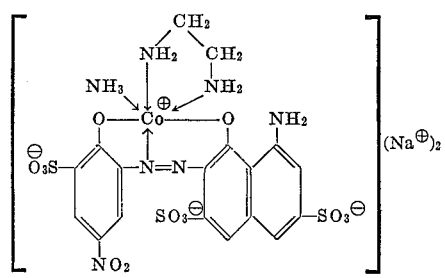

(which is obtained as described below) in 500 parts of water is added, during 30 minutes, to a stirred suspension of 24.1 parts of cyanuric chloride in a mixture of 400 parts of water and 100 parts of acetone, the temperature of the mixture being maintained between 0° and 5° C. by external cooling, and the pH of the mixture being maintained between 6.5 and 7.0 by the addition of sodium carbonate. The mixture is then stirred for a further 30 minutes at the same temperature and pH, and the precipitated dyestuff is then filtered off, washed with a 5% aqueous solution of potassium chloride, mixed with 10 parts of a phosphate buffer of pH 6.5 and dried.

The product consists essentially of the compound of the formula:

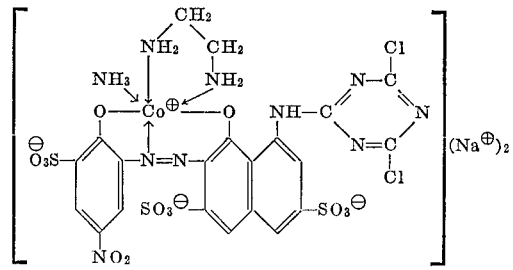

When applied to cellulose textile materials in conjunction with a treatment with an acid-binding agent the dyestuff yields reddish-grey shades possessing excellent fastness to light and to wet treatments.

The 1:1-cobalt complex used in the above example was obtained as follows:

A mixture of 78.2 parts of the dipotassium salt of the 1:1-cobalt complex of 1-amino-7-(2'-hydroxy-5'-nitro-3'-sulphophenylazo)-8-naphthol-3:6-disulphonic acid containing coordinated ammonia (which is obtained by reacting 1-amino-7-(2'-hydroxy-5'-nitro - 3' - sulphophenylazo)-8-naphthol-3:6-disulphonic acid with an ammoniacal solution of one molecular proportion of cobaltous sulphate), 66 parts of ethylene diamine and 250 parts of water is stirred for 18 hours at 80° C. When evolution of ammonia is complete 75 parts of potassium chloride are added, the mixture is cooled to 20° C. and the precipitated 1:1-cobalt complex is filtered off and dried.

The following table gives further examples of the metal-containing azo dyestuffs of the invention which are obtained by methods similar to that described in Example 2 by reacting cyanuric chloride with the 1:1-cobalt complexes obtained by treating the metallisable azo compounds listed in the second column of the table with the cobaltous complexes obtained from cobaltous sulphate and the polydentate nitrogen-donor ligands listed in the third column of the table. The fourth column of the table indicates the shades obtained when the dyestuffs are applied to cellulose textile materials in conjunction with a treatment with an acid-binding agent.

EXAMPLE 25

A solution of 20 parts of 2:4-dichloro-6-methoxy-1:3:5-triazine in 100 parts of acetone is added to a solution of 75.2 parts of the 1:1-cobalt complex of the formula:

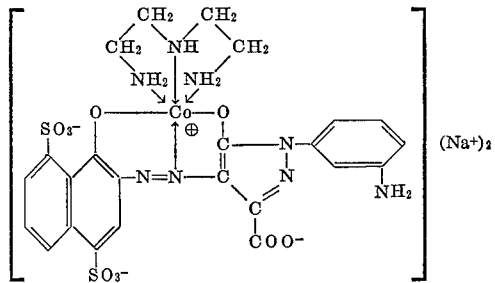

(which is obtained as described below) in 500 parts of water, and the resulting mixture is stirred for 2 hours at 30° C. while the pH is maintained between 6 and 6.5 by the addition of sodium carbonate. The mixture is then cooled to 20° C., ethanol is added to precipitate the dyestuff, which is then filtered off and dried.

On analysis the dyestuff is found to contain 1 atom of organically bound chlorine per molecule of dyestuff.

When applied to wollen textile materials from a neutral or slightly acid dyebath the dyestuff yields red shades

| Example | Metallisable azo compound | Polydentate nitrogen-donor ligand | Shade |
|---|---|---|---|
| 3 | 1-amino-7-(2'-hydroxy-3'-sulpho-5'-nitrophenylazo)-8-naphthol-3:6-disulphonic acid. | Dipyridyl | Reddish-grey. |
| 4 | do | Diethylenetriamine | Do. |
| 5 | do | 1-(4'-sulphophenyl)biguamide | Do. |
| 6 | 1-(2'-hydroxy-3'-nitro-5'-sulphophenylazo)-2-naphthol-3:6-disulphonic acid. | Triethylenetetramine | Reddish-blue. |
| 7 | 1-(2'-hydroxy-5'-sulphophenylazo)-2-naphthol-3:6-disulphonic acid | N-(p-aminobenzyl)-N:N-di-(β-aminoethyl)amine | Bluish-red. |
| 8 | 1-amino-7-(2'-hydroxy-5'-nitro-3'-sulphophenylazo)-8-naphthol-3:6-disulphonic acid. | do | Reddish-blue. |
| 9 | 1-(2'-hydroxy-4'-sulphophenylazo)-2-naphthol-7-sulphonic acid | Triethylene tetramine | Bluish-red. |
| 10 | 1-(4'-sulphophenyl)-3-methyl-4-(1''-hydroxy-4'':8''-disulphonaphth-2''-ylazo)-5-pyrazolone. | do | Do. |
| 11 | 1-(2'-methyl-3'-amino-5'-sulphophenyl)-3-methyl-4-(1''-hydroxy-4'':8''-disulphonaphth-2''-ylazo)-5-pyrazolone. | do | Do. |
| 12 | 1-amino-7-(2'-hydroxy-5'-chloro-3'-sulphophenylazo)-8-naphthol-3:6-disulphonic acid. | Diethylene triamine | Blue. |
| 13 | 1-(2'-carboxy-4'-aminophenylazo)-2-naphthol-3:6-disulphonic acid | do | Violet. |
| 14 | 2-(2'-carboxy-4'-aminophenylazo)-1-naphthol-3:6-disulphonic acid | do | Greenish-blue. |
| 15 | 2-(2'-hydroxy-3'-amino-5'-sulphophenylazo)-1-naphthylamino-4:8-disulphonic acid. | do | Do. |
| 16 | 2-(4'-amino-3'-sulphophenylamino)-7-(2''-carboxyphenylazo)-8-naphthol-6-sulphonic acid. | do | Grey. |
| 17 | 1-(3'-aminophenyl)-3-methyl-4-(1'-hydroxy-4'':8''-disulphonaphth-2''-ylazo)-5-pyrazolone. | p-Amino-N:N-di(β-aminoethyl)-aniline | Red. |

The following table gives further examples of the metal-containing azo dyestuffs of the invention which are obtained, by methods similar to that described in Example 1, by reacting with cyanuric chloride and then with the amines listed in the fourth column of the table the 1:1-cobalt complexes which are obtained by treating the metallisable azo compounds listed in the second column of the table with the cobaltous complexes obtained from cobaltous sulphate and the polydentate nitrogen-donor ligands listed in the third column of the table. The fifth column of the table indicates the shades obtained when the dyestuffs are applied to cellulose textile materials in conjunction with a treatment with an acid-binding agent.

possessing excellent fastness to light and to wet treatments.

The 1:1-cobalt complex used in the above example was itself obtained as follows:

41 parts of bis(diethylenetriamine) cobaltic chloride is added to a boiling solution of 61.5 parts of the trisodium salts of 1-(3'-aminophenyl)-3-carboxy-4-(1''-hydroxynaphth-2''-ylazo-4'':8''-disulphonic acid)-5-pyrazolone in 500 parts of water. The mixture is boiled for 15 minutes, cooled to 60° C. and poured into 5000 parts of ethanol. The 1:1-cobalt complex which is precipitated is filtered off and dried.

The following table gives further examples of the

| Example | Metallisable azo compound | Polydentate nitrogen-donor ligand | Amine | Shade |
|---|---|---|---|---|
| 18 | 1-amino-7-(2'-hydroxy-3'-sulpho-5' nitrophenylazo-8-naphthol-3:6-disulphonic acid. | Ethylenediamine | Aniline-3:5-disulphonic acid | Reddish-grey. |
| 19 | do | Dipyridyl | do | Do. |
| 20 | 1-(3'-aminophenyl)-3-methyl-4-(2''-hydroxy-3'':5'-disulpho phenylazo)-5-pyrazolone. | Diethylenetriamine | do | Golden yellow. |
| 21 | 1-(3'-aminophenyl)-3-carboxy-4-(1''-hydroxy-4'':8''-disulphonaphth-2''-ylazo)-5-pyrazolone. | do | do | Red. |
| 22 | 2-amino-6-(2'-hydroxy-3':5'-disulphophenylazo)-5-naphthol-7-sulphonic acid. | do | Ammonia | Bluish-red. |
| 23 | 1-(2'-methyl-3'-amino-5'-sulphophenyl)-3-carboxy-4-(1''-hydroxy-4'':8''-disulphonaphth-2''-ylazo)-5-pyrazolone. | do | do | Red. |
| 24 | 1-(2'-hydroxy-5'-sulphophenylazo)-2-naphthol-3:6-disulphonic acid. | Triethylenetetramine | do | Bluish-red. | metal-containing azo dyestuffs of the inventiton which are obtained, by methods similar to that described in Example 25, by reacting the heterocyclic compounds listed in the fourth column of the table with the 1:1-cobalt complexes of the azo compounds listed in the second column of the table and containing the polydentate nitrogen-donor ligands listed in the third column of the table. The fifth column of the table indicates the shades obtained when the dyestuffs are applied to cellulose textile materials in conjunction with a treatment with an acid-binding agent.

off under reduced pressure and the precipitated dyestuff is filtered off, washed with water and dried.

When applied to wool from a neutral or sightly alkaline dyebath the dyestuff yields blue shades possessing excellent fastness to light and to wet treatments.

The 1:1-cobalt complex used in the above example is obtained as follows:

41 parts of bis(diethylene triamine) cobaltic are added to a stirred mixture of 32.5 parts of 1-(2'-hydroxy-4'-nitrophenylazo)-8-amino-2-naphthol, 20 parts of sodium

| Example | Azo compound | Polydentate nitrogen-donor ligand | Heterocyclic compound | Shade |
|---|---|---|---|---|
| 26 | 1-(3'-aminophenyl)-3-methyl-4-(1'-hydroxy-4':8'-disulphonaphth-2'yl-azo)-5-pyrazolone. | Diethylenetriamine | 2:4-dichloro-6-(3':5'-disulphoanilino)-1:3:5- triazine. | Red. |
| 27 | do | do | 2:4:6-trichloropyrimidine | Red. |
| 28 | do | do | 2:4:5:6-tetrachloropyrimidine | Red. |
| 29 | do | do | 2:3-dichloroquinoxaline-6-sulphonchloride | Red. |
| 30 | do | do | 2:3-dichloroquinoxaline-6-carboxylic acid chloride | Red. |
| 31 | do | do | 2:4-dichloroquinazoline-6-sulphon chloride | Red. |
| 32 | do | do | 2:4-dichloroquinazoline-6-carboxylic acid chloride | Red. |
| 33 | 1-amino-7-(2'-hydroxy-4'-nitrophenylazo)-8-naphthol 3:6-disulphonic acid. | do | 2:4-dichloroquinazoline-6-methoxy-1:3:5-triazine | Blue. |
| 34 | 1-(2'-methyl-3'-amino-5'sulphophenyl)-3-methyl-4-(1-hydroxy-4":8"-disulphonaphth-2"-ylazo)-5-pyrazolone. | do | 2:4-dichloro-6-methoxy-1:3:5-triazine | Red. |
| 35 | 1-(2'-methyl-3'-amino-5'-sulphophenyl)-3-methyl-4-(2"-hydroxy-6"-nitro-4"-sulphonaphth-1"-ylazo)-5-pryazolone. | do | do | Red. |
| 36 | 1-(3'-aminophenyl)-3-carboxy-4-(2'''-hydroxy-5''-chloro-4''-nitro-3''-sulphophenylazo)-5-pyrazolone. | do | do | Red. |
| 37 | do | do | 2:4-dichloro-6-(3':5'-disulphoanilino)-1:3:5-triazine | Red. |
| 38 | 1-(2'-methyl-3'-amino-5'-sulphophenyl)-3-carboxy-4(2"-hydroxy-6"-nitro-4"-sulphonaphth 1"-ylazo)-5-pyrazolone. | do | do | Red. |
| 39 | 2-amino-6-(2'-hydroxy-5'-sulphophenylazo)-5-naphthol-1:7-disulphonic acid. | do | do | Bordeaux. |
| 40 | 1-(3'-aminophenyl)-3-methyl-4-(1"-hydroxy-4":8"-disulphonaphth-2"-ylazo)-5-pyrazolone. | do | 2:4-dichloro-6-(2'-methyl-5'-sulphoanilino)1:3:5-triazine. | Red. |
| 41 | 1-(3'-aminophenyl)-3-carboxy-4-(1"-hydroxy-4":8"-disulphonaphth-2"-ylazo)-5-pyrazolone. | do | do | Red. |
| 42 | 1-(3'-aminophenyl)-3-methyl-4-(2"-hydroxy-5"-(3''':5'''-disulphophenylazo)-phenylazo)-5-pyrazolone. | do | 2:4-dichloro-6-(3':5'-disulphoanilino-1:3:5-triazine | Red. |
| 43 | α-(2-hydroxy-3:5-disulphophenylazo)-β-ketobutyric acid N-(3'-aminophenyl)amide. | do | do | Yellow. |
| 44 | 1-(3'-aminophenyl)-3-methyl-4-(1'-hydroxy-4':8'-disulphonaphth-2'-ylazo)-5-prazolone. | do | 2:4-dithiocyanato-6-chloro-1:3:5-triazine | Red. |

EXAMPLE 45

A solution of 52 parts of the 1:1-cobalt complex of the formula:

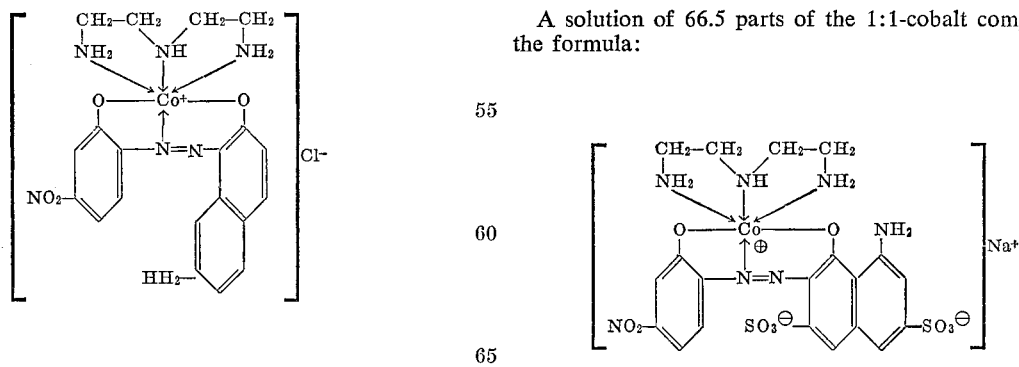

(which is obtained as described below) in a mixture of 500 parts of acetone and 500 parts of water is adjusted to a pH between 6.5 and 7.0 by the addition of sodium carbonate, and the solution is then cooled to 0° C. 47.5 parts of acryloyl chloride are then gradually added, during 30 minutes, whilst the pH of the mixture is maintained between 6.0 and 7.0 by the addition of sodium carbonate. The mixture is stirred for a further 30 minutes at 0° C. and is then filtered. The acetone is then distilled carbonate, 750 parts of ethanol and 500 parts of water at the boil. The mixture is stirred at the boil under a reflux condenser for 10 minutes, cooled to 20° C. and the precipitated 1:1-cobalt complex is filtered off, washed with water and dried.

EXAMPLE 46

A solution of 66.5 parts of the 1:1-cobalt complex of the formula:

(which is obtained as described below) in 3500 parts of water is adjusted to a pH between 6.5 and 7.0 by the addition of sodium carbonate, and the solution is then cooled to 0° C. 75 parts of acryloyl chloride are then gradually added, during 30 minutes, whilst the pH of the mixture is maintained between 6.0 and 7.0 by the addition of sodium carbonate. The mixture is stirred for a further 30 minutes, during which time the temperature is raised to 25° C., and the precipitated dyestuff is filtered off, washed with water and dried.

When applied to wool from a neutral or slightly acid dyebath the dyestuff yields blue shades possessing excellent fastness to light and to wet treatments.

The 1:1-cobalt complex used in the above example is obtained as follows:

41 parts of bis(diethylene triamine) cobaltic chloride is added to a stirred mixture of 52.8 parts of the disodium salt of 1-amino-7-(2'-hydroxy - 4' - nitrophenylazo) - 8 - naphthol-3:6-disulphonic acid, 16 parts of sodium carbonate and 800 parts of water at 95° C. The mixture is stirred at 95° C. for a further 30 minutes and then 160 parts of sodium chloride are added. The mixture is then cooled to 20° C. and the precipitated 1:1-cobalt complex is filtered off, washed with a 20% aqueous solution of sodium chloride and dried.

The following table gives further examples of the cobalt-containing azo dyestuffs of the invention which are obtained by methods similar to those described in Examples 45 and 46 by treating with the acylating agents listed in the fourth column of the table the 1:1-cobalt complexes, containing the coordinated polydentate nitrogen-donor ligands listed in the third column of the table, of the metallisable azo dyestuffs listed in the second column of the table. The fifth column of the table lists the shades obtained when the dyestuffs are applied to wool textile materials.

EXAMPLE 57

A solution of 51 parts of the 1:1-cobalt complex of 1 - (3' - aminophenyl) - 3-methyl-4-(3''-hydroxy-4''-nitrophenylazo)-5-pyrazolone containing coordinated diethylene triamine in a mixture of 1000 parts of water and 1000 parts of dioxan is added cyanuric chloride in 200 parts of acetone and 200 parts to a suspension of 22 parts of water, whilst the resulting mixture is maintained as 5° C., and the pH at 6.5 by the gradual addition of sodium carbonate. The mixture is stirred for a further 30 minutes and is then filtered. The resulting solid is dissolved in 1250 parts of acetone, 33 parts of diethanolamine are then added and the mixture is stirred at 40° C. for 1 hour. The acetone is then removed by distillation in vacuum, the residue is stirred with water, and the solid is then filtered off, washed with water and dried. The product consists essentially of the compound of the formula:

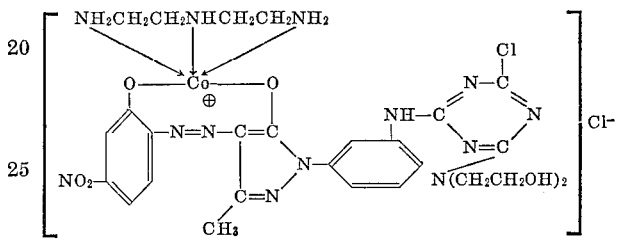

| Example | Metallisable azo dyestuff | Polydentate nitrogen-donor ligand | Acylating agent | Shade |
|---|---|---|---|---|
| 47 | 1-amino-7-(2'-hydroxy-4'-nitrophenylazo)-8-naphthol-3:6-disulphonic acid. | Diethylene triamine | Chloracetyl chloride | Blue. |
| 48 | do | do | β-chloropropionyl chloride | Do. |
| 49 | 1-(3'-aminophenyl)-3-methyl-4-(2''-hydroxy-4''-nitrophenylazo)-5-pyrazolone. | do | Acryloyl chloride | Red. |
| 50 | 1-(3'-aminophenyl)-3-carboxy-4-(2''-hydroxy-4''-nitrophenylazo)-5-pyrazolone. | do | do | Red. |
| 51 | 1-(3'-aminophenyl)-3-methyl-4-(2''-hydroxy-5''-sulphonylazo)-5-pyrazolone. | do | Acrylic anhydride | Reddish-yellow. |
| 52 | 1-(2'-hydroxy-4'-nitrophenylazo)-8-amino-2-naphthol | do | α-chloroacryloyl chloride | Blue. |
| 53 | do | do | Chloroacetic anhydride | Do. |
| 54 | 1-(3'-aminophenyl)-3-methyl-4-(1''-hydroxy-4'':8'-disulphonaphth-2''-ylazo)-5-pyrazolone. | do | Acryloyl chloride | Red. |
| 55 | do | Triethylene tetramine | do | Red. |

EXAMPLE 56

A solution of 52 parts of the 1:1-cobalt complex of 1-(2'-hydroxy-4'-nitrophenylazo)- 8 - amino - 2 - naphthol containing coordinated diethylene triamine in a mixture of 500 parts of acetone and 500 parts of water is stirred at 35° C. and a solution of 20 parts of 2:4-dichloro-6-methoxy-1:3:5-triazine in 100 parts of acetone is added. The mixture is stirred for 2 hours at 35° C. while the pH is maintained between 6 and 7 by the addition of sodium carbonate. The precipitated dyestuff is then filtered off, washed with water and dried.

When applied to polyamide textile material from a neutral or slightly alkaline dyebath the dyestuff yields blue shades possessing excellent fastness to light and to wet treatments.

In place of the 2:4-dichloro-6-methoxy-1:3:5-triazine used in the above example there is used an equivalent amount of 2:4:6-trichloropyrimidine whereby a blue dyestuff is obtained which also possesses excellent fastness properties when applied to polyamide textile materials.

When 51 parts of the 1:1-cobalt complex of 1-(3'-aminophenyl) - 3 - methyl-4-(2''-hydroxy-4''-nitrophenylazo)-5-pyrazolone containing coordinated diethylene triamine are used in place of the cobalt complex used in the above example a dyestuff is obtained which yields red shades of excellent fastness properties when applied to polyamide textile material.

When applied to polyamide textile material from a neutral or slightly alkaline dyebath the dyestuff yields red shades possessing excellent fastness to light and to wet treatments.

EXAMPLE 58

A solution of 94 parts of the dyestuff of Example 4 in 1000 parts of water is stirred for 1 hour with a solution of 20 parts of the sodium salt of 2-mercaptobenzthiazole in 250 parts of water at 20° C. The pH of the mixture is then adjusted to 6.4 and 150 parts of sodium chloride are added. The precipitated dyestuff is then filtered off and dried. When applied to cellulose textile materials the dyestuff yields blue-grey shades possessing excellent fastness to light and to wet treatments.

In place of the 20 parts of the sodium salt of 2-mercaptobenzthiazole used in the above example there are used 51 parts of sodium sulphite crystals or 50 parts of sodium diethyl dithiocarbamate, whereby dyestuffs are produced which also dye cellulose textiles in blue-grey shades having similar excellent fastness properties.

EXAMPLE 59

A solution of 86.9 parts of the trisodium salt of the 1:1-cobalt complex containing 1 molecule of coordinated diethylene triamine of 1-(2'-methyl-3'-amino-5' - sulphophenyl)-3-carboxy - 4 - (1'-hydroxy-4':8'-disulphonaphth-2'-ylazo)-5-pyrazolone, (which is prepared by a method analogous to that used in Example 25)

in 500 parts of water is added, during 30 minutes, to a stirred suspension of 20.3 parts of cyanuric chloride in a mixture of 400 parts of water and 100 parts of acetone, the temperature of the resulting mixture being maintained between 0° and 5° C. by external cooling, and the pH of the mixture being maintained between 6.5 and 7.0 by the addition of sodium carbonate. After stirring for 1 hour at 0° to 5° C. and at pH 6.5 to 7.0, there is added an acetone solution of 24.6 parts of 4-aminobenzenesulphon-N-β-chloroethylamide, and the resulting mixture is stirred for 3 hours at 40° to 45° C. whilst maintaining the pH at 7.0 by addition of sodium carbonate. 200 parts of potassium chloride are then added and, after stirring for 1 hour, the precipitated dyestuff is filtered off, washed with a 20% aqueous solution of potassium chloride and dried. When applied to cellulose textile materials in conjunction with a treatment with an acid-binding agent, red shades are obtained having excellent fastness to light and to wet treatments.

The following table gives further examples of the 1:1-cobalt complexes of the invention which are obtained by methods similar to that described in Example 59, by reacting the 1:1-cobalt complexes of the azo compounds listed in the second column of the table, said complexes containing a coordinated molecule of the polydentate nitrogen-donor ligands listed in the third column of the table, with the number of molecules of cyanuric chloride listed in the fourth column of the table and finally replacing one of the two chloride atoms attached to each triazine ring by a substituted amino group by treatment with the amines listed in the fifth column of the table. The sixth column of the table indicates the shades obtained when the resulting 1:1-cobalt complexes of these examples are applied to cellulose textile materials in conjunction with a treatment with an acid-binding agent.

EXAMPLE 81

A solution of 70 parts of the sodium salt of the 1:1-cobalt complex containing one molecule of coordinated diethylene triamine of 1-(4'-aminophenyl)-3-methyl-4-(1'-hydroxy-4':8'-disulphonaphth - 2' - ylazo)-5-pyrazolone (which is obtained by a method analogous to that described in Example 25) in 500 parts of water is added, during 30 minutes, to a stirred suspension of 20.3 parts of cyanuric chloride in a mixture of 400 parts of water and 100 parts of acetone, the temperature of the mixture being maintained between 0° C. and 5° C. by external cooling, and the pH of the mixture being maintained between 6.5 and 7.0 by the addition of sodium carbonate. The mixture is then stirred for a further 1 hour at the same temperature and pH, and a solution, previously adjusted to pH 7.0, of 20.7 parts of 3-amino-aniline-4-sulphonic acid in 300 parts of water is added. The mixture is then stirred at 40° to 45° C. for 3 hours whilst maintaining a pH of 7 by the addition of sodium carbonate. The resultant solution is cooled to 0° to 5° C. and added, during 30 minutes, to a stirred suspension of 20.3 parts of cyanuric chloride in a mixture of 200 parts of water and 50 parts of acetone, the temperature of the mixture being maintained between 0° C. and 5° C. by external cooling, and the pH of the mixture being maintained between 6.5 and 7.0 by the addition of sodium carbonate. The mixture is then stirred for a further 1 hour at the same temperature and pH, and a neutral solution of 27.8 parts of aniline-2:5-disulphonic acid in 200 parts of water is added. The mixture is then stirred at 40° to 45° C. for 3 hours whilst maintaining a pH of 7 by the addition of sodium carbonate. 400 parts of potassium chloride are added and, after stirring for 1 hour, the precipitated dyestuff is filtered off, washed with a 25% aqueous solution of

| Example | Azo compound | Polydentate nitrogen-donor ligand | Mols of cyanuric chloride | Amine | Shade |
|---|---|---|---|---|---|
| 60 | 1-(4'-aminophenyl)-3-methyl-4-(1'-hydroxy-4':8'-disulphonaphth-2'-ylazo)-5-pyrazolone. | Triethylene tetramine | 2 | Sulphanilic acid | Red. |
| 61 | do | do | 2 | N-methyl metanilic acid | Red. |
| 62 | do | Diethylene triamine | 1 | 1-naphthylamine-3:6:8-trisulphonic acid. | Red. |
| 63 | do | do | 1 | 5-sulphoanthranilic acid | Red. |
| 64 | 1-(3'-aminophenyl)-3-methyl-4-(1'-hydroxy-4':8'-disulphonaphth-2'-ylazo)-5-pyrazolone. | N:N-di(β-aminoethyl)-ethylene diamine. | 2 | N-methylsulphanilic acid | Red. |
| 65 | do | N-(β-aminoethyl)-1:3-diaminopropane. | 1 | Aniline-2:5-disulphonic acid | Red. |
| 66 | do | 2-aminomethylpyridine | 1 | do | Red. |
| 67 | 1-(2'-methyl-3'-amino-5'-sulphophenyl)-3-carboxy-4-(2'-hydroxy-6'-nitro-4'-sulphonaphth-1'-ylazo)-5-pyrazolone. | o-Phenantholine | 1 | Sulphanilic acid | Red. |
| 68 | 1-amino-7-(2'-carboxyphenylazo)-8-naphthol-3:6-disulphonic acid. | 1:2:3-triaminopropane | 1 | o-toluidine-4-sulphonic acid | Blue. |
| 69 | do | 2-aminomethyl-1:3-diaminopropane. | 1 | do | Do. |
| 70 | 1-(2'-methyl-3'-amino-5'-sulphophenyl)-3-methyl-4-(2'-hydroxy-3'-nitro-5'-sulphophenylazo)-5-pyrazolone. | 1:2-diaminopropane | 1 | Aniline-3:5-disulphonic acid | Orange. |
| 71 | do | di-(β-methylaminoethyl)-amine | 1 | do | Do. |
| 72 | do | 8-aminoquinoline | 1 | do | Do. |
| 73 | 1-amino-7-(quinoline-8'-ylazo)-8-naphthol-3:6-disulphonic acid. | Diethylene triamine | 1 | do | Greenish-grey. |
| 74 | 1-N-phenylamino-2-(2'-hydroxy-3'-amino-5'-sulphophenylazo) naphthalene-6-sulphonic acid. | do | 1 | Aniline-2:5-disulphonic acid | Green. |
| 75 | 1-N-methylamino-2-(2'-hydroxy-3'-amino-5'-sulphophenylazo)-naphthalene-6-sulphonic acid. | Triethylene tetramine | 2 | do | Do. |
| 76 | 2-N-methylamino-6-(2'-hydroxy-3':5'-disulphophenylazo)-8-naphthol-6-sulphonic acid. | Biguanide | 1 | do | Violet. |
| 77 | do | N-methyl ethylene diamine | 1 | do | Do. |
| 78 | 1-(4'-aminophenyl)-3-methyl-4-(1'-hydroxy-4':8'-disulphonaphth-2'-ylazo)-5-pyrazolone. | N:N-di(β-aminoethyl)-p-aminobenzylamine. | 2 | N-methyl metanilic acid | Red. |
| 79 | do | do | 2 | 4-aminobenzene-sulphon-β-chloroethylamide. | Red. |
| 80 | 1-(2'-methyl-3'-amino-5'-sulphophenyl)-3-carboxy-4-(1'-hydroxy-4':8'-disulphonaphth-2'-ylazo)-5-pyrazolone. | Triethylene tetramine | 2 | 4-aminobenzene-sulphon-β-chloropropylamide. | Red. | potassium chloride, and dried. The dyestuff so obtained consists essentially of the compound of the formula:—

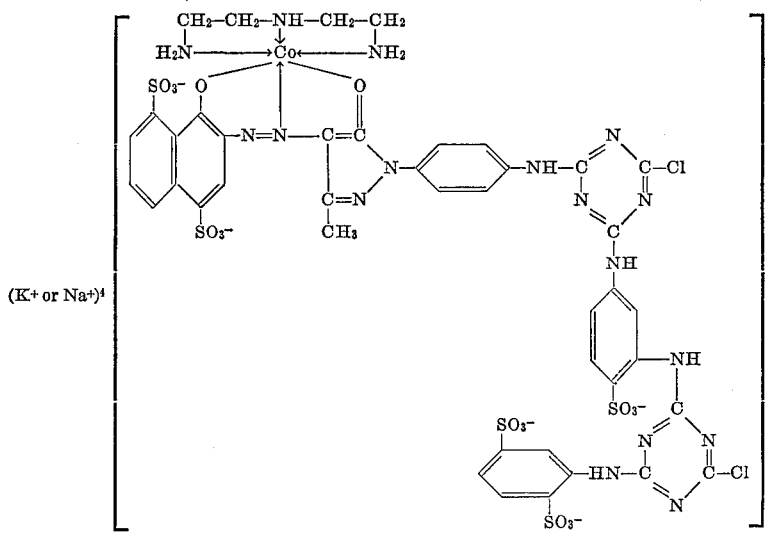

When applied to cellulose textile materials in conjunction with a treatment with an acid-binding agent red shades are obtained having excellent fastness to light and to wet treatments.

We claim:
1. Metal-containing azo dyestuffs represented by the formula

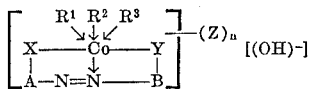

wherein:
A is selected from the class consisting of phenylene and naphthylene radicals carrying a group selected from the class consisting of —O— and —COO— represented by X in ortho position to the azo group, and any other substituents on A are selected from the class consisting of nitro, sulphonic acid, chlorine, amino and disulphophenylazo;
B—Y— represents the residue of a coupling component which couples in adjacent position to a metallizable group present in said coupling component and is selected from the class consisting of naphthol, naphthylamine, 1-phenyl-5-pyrazolone and acetoacet-N-(aminophenyl) amide coupling components;
Y is selected from the class consisting of —O— and

wherein R is selected from the class consisting of hydrogen, lower alkyl and phenyl and any other substituents on B are selected from the class consisting of hydroxy, amino, sulphonic acid, lower alkyl, 4-amino-3-sulphophenylamino and carboxy;
Z is an acyl radical selected from the class consisting of 1:3:5 triazinyl and 1:3:5-pyrimidyl radicals substituted by from 1–2 chlorine atoms and any other substituent on said triazinyl and pyrimidyl rings is selected from the class consisting of lower alkoxy, amino, bis-(hydroxyethyl)amino, 3 - sulphoanilino, 4-sulphoanilino, N-methyl-3-sulphoanilino, N-methyl-4-sulphoanilino, 2-methyl-5-sulphoanilino, 2-carboxy-5-sulphoanilino, 2,5-disulphoanilino, 3,5-disulphoanilino, 4-(β-chloroethylsulphamyl)anilino, 4-(β-chloropropylsulphamyl) aniline and 3,6,8-trisulpho-1-naphthylamino; trichloropyrimidyl; dithiocyanatotriazinyl; disulphotriazinyl; bis(diethyldithiocarbamyl); bis(benzthiazoolylthio); 2:3-dichloroquinoxaline-6-sulphonyl; 2:3-dichloroquinoxaline-carbonyl; 2:4 - dichloroquinazoline-6-carbonyl;

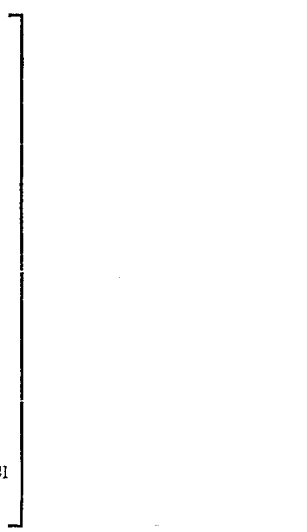

acryloyl; chloroacryloyl; chloroacetyl and chloropropionyl radicals; said radical being attached through a bridging group selected from the class consisting of —NH— and

lower alkyl to a carbon atom of an aryl ring present in A and B and to a carbon atom present in $R^1$, $R^2$ and $R^3$;

$n$ is an integer of from 1 to 3; and at least two off $R^1$, $R^2$ and $R^3$ together form a molecule of a polydentate nitrogen-donor ligand containing at least two primary, secondary or tertiary amino groups and when said ligand is a bidentate nitrogen-donor ligand, then the third of $R^1$, $R^2$ and $R^3$ represents a monodentate nitrogen-donor ligand or a further molecule of a bidentate nitrogen-donor ligand, said ligand or ligands being co-ordinately bonded to the cobalt atom through the nitrogen atoms present therein, said polydentate nitrogen-donor ligand being selected from the group consisting of diaminoalkylene wherein the alkylene radical contains 2–3 carbon atoms, N-lower alkyl diaminoalkylene, N-(amino lower alkyl) diaminoalkylene, and C-(amino lower alkylene) diaminoalkylene wherein the lower alkyl moiety of each has 1–4 carbon atoms and the alkylene radical of each contains 2–3 carbon atoms, o-diaminobenzene, 2:2'-dipyridyl, terpyridyl, o-phenanthroline and 8-amino-quinoline and said monodentate ligand is selected from the group consisting of water, ammonia or a primary or secondary monoamine.

2. The metal-containing azo dyestuff of claim 1 having the formula:

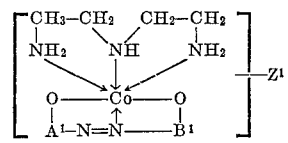

wherein:
$A^1$ represents a 1:2 phenylene radical which can contain a substituent selected from the class consisting of nitro, sulphonic acid, chlorine, amino and disulphophenylazo;
$B^1$—O represents the residue of a coupling component which couples in adjacent position to a hydroxy group, said coupling component being selected from the class consisting of naphthol, naphthylamine, 1-phenyl-5-pyrazolone and acetoacet-N-(aminophenyl)amide coupling components and any substituents on $B^1$ are selected from the class consisting of hydroxy, amino, sulphonic acid, lower alkyl, 4-amino-3-sulphophenyl-
amino and carboxy; and $Z^1$ represents a 1:3:5 triazin-2-ylamino radical, attached to an aryl ring present in $A^1$ and $B^1$, which is substituted by from 1 to 2 chlorine atoms and any other substituent is selected from the class consisting of lower alkoxy, amino, bis(hydroxyethyl)amino, 3-sulphoanilino, 4-sulphoanilino, N-methyl-3-sulphoanilino, N-methyl-4-sulphoanilino, 2-methyl-5-sulphoanilino, 2-carboxy-5-sulphoanilino, 2,5-disulphoanilino, 3,5-disulphoanilino, 4-(β-chloroethylsulphamyl)anilino, 4-(β-chloropropylsulphamyl) anilino and 3,6,8-trisulpho-1-naphthylamino.

3. The metal-containing azo dyestuff of claim 1 having the formula:

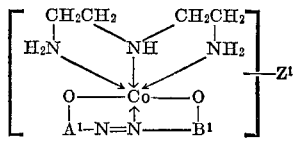

wherein:

$A^1$ represents a naphthalene radical which can contain a substituent selected from the class consisting of nitro and sulphonic acid and which carries the oxygen atom and the azo group in ortho position to each other;

$B^1$—O represents the residue of a coupling component which couples in adjacent position to a hydroxy group, said coupling component being 1-phenyl-5-pyrazolone which can be substituted with a member selected from the class consisting of lower alkyl, amino, sulphonic acid and carboxy; and $Z^1$ represents a 1:3:5-triazin-2-ylamino radical attached to an aryl ring present in $A^1$ and $B^1$, which is substituted by from 1 to 2 chlorine atoms and any other substituent is selected from the class consisting of lower alkoxy, amino, bis(hydroxyethyl)amino, 3-sulphoanilino, 4-sulphoanilino, N-methyl-3-sulphoanilino, N-methyl-4-sulphoanilino, 2-methyl-5-sulphoanilino, 2-carboxy-5-sulphoanilino, 2,5-disulphoanilino, 3,5-disulphoanilino, 4-(β-chloroethylsulphamyl)anilino, 4-(β-chloropropyl-sulphamyl)anilino and 3,6,8-trisulpho-1-naphthylamino.

4. The metal-containing azo dyestuff of claim 1 having the formula:

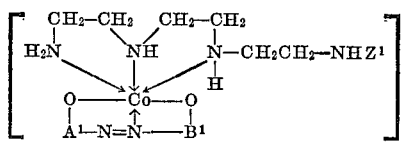

wherein:

$A^1$ represents a naphthalene radical which can contain a sulphonic acid substituent and which carries the oxygen atom and the azo group in othro position to each other;

$B^1$—O represents the residue of a coupling component which couples in adjacent position to a hydroxy group, said coupling component being 1-phenyl-5-pyrazolone which can be substituted with a member selected from the class consisting of lower alkyl, amino, sulphonic acid; and $Z^1$ represents a 1:3:5 triazine radical substituted with two chlorine atoms.

5. The metal-containing azo dyestuff of claim 1 having the formula:

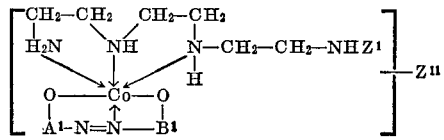

wherein:

$A^1$ represents a naphthalene radical which can contain a sulphonic acid substituent and which carries the oxygen atom and the azo group in ortho position to each other;

$B^1$—O represents the residue of a coupling component which couples in adjacent position to a hydroxy group, said coupling component being 1-phenyl-5-pyrazolone which can be substituted with a member selected from the class consitsing of lower alkyl, amino, sulphonic acid and carboxy;

$Z^1$ represents a 1:3:5 triazine radical substituted by from 1 to 2 chlorine atoms and any other substituent is selected from the class consisting of sulphoanilino and chloropropylamino sulphoanilino; and $Z^{11}$ represents a 1:3:5 triazin-2-ylamino radical attached to an aryl ring present in $A^1$ and $B^1$ which is substituted by from 1 to 2 chlorine atoms and any other substituent is selected from the class consisting of lower alkoxy, amino, bis(hydroxyethyl)amino, 3-sulphoanilino, 4-sulphanilino, N-methyl-3-sulphoanilino, N-methyl-4-sulphoanilino, 2-methyl-5-sulphoanilino, 2-carboxy-5-sulphoanilino, 2,5-disulphoanilino, 3,5-disulphoanilino, 4-(β-chloroethylsulphamyl)anilino, 4-(β-chloropropyl sulphamyl)anilino and 3,6,8 - trisulpho - 1 - naphthylamino.

References Cited

FOREIGN PATENTS 830,970   3/1960   Great Britain.

CHARLES B. PARKER, Primary Examiner

D. M. PAPUGA, Assistant Examiner

U.S. Cl. X.R.

8—41, 54, 54.2; 260—147, 148, 149, 150, 153, 154, 160, 162, 198